Oct. 21, 1924.
W. B. BYAM
STRAINER HOLDER
Filed Jan. 15, 1924
1,512,875
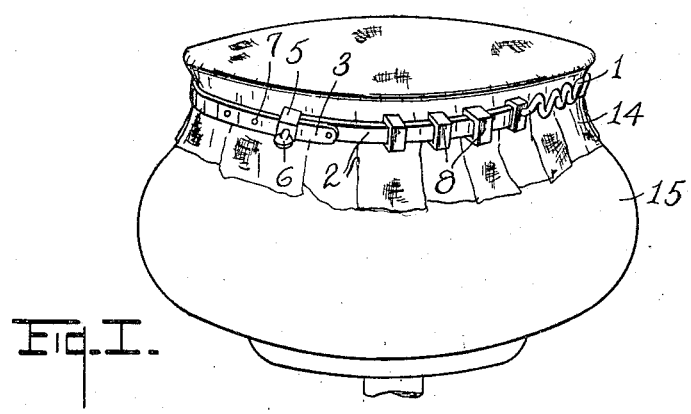
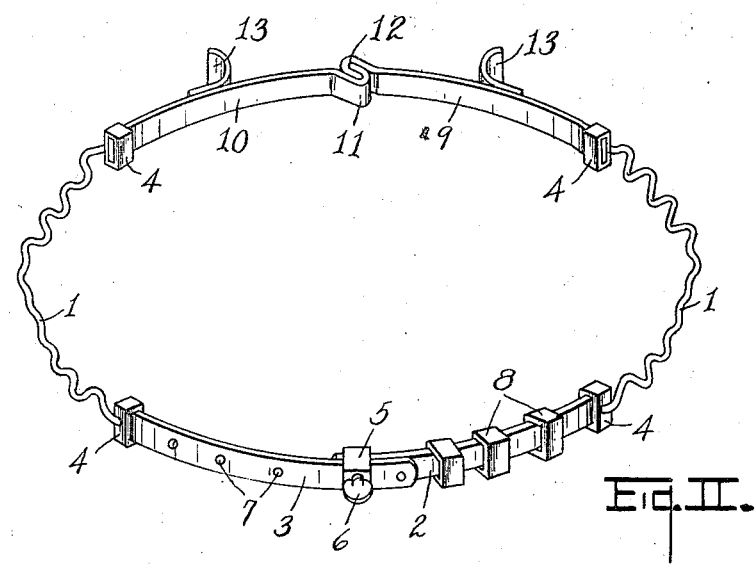
INVENTOR
William B. Byam
BY Chappell Earl
ATTORNEYS Patented Oct. 21, 1924.

1,512,875

UNITED STATES PATENT OFFICE.

WILLIAM B. BYAM, OF GRAND RAPIDS, MICHIGAN.

STRAINER HOLDER.

Application filed January 15, 1924. Serial No. 686,268.

*To all whom it may concern:*

Be it known that I, WILLIAM B. BYAM, a citizen of the United States, residing at Grand Rapids, county of Kent, State of Michigan, have invented certain new and useful Improvements in Strainer Holders, of which the following is a specification.

This invention relates to improvements in strainer holders.

The main object of this invention is to provide an improved strainer holder for holding a straining cloth over a receptacle such as the supply can of a cream separator which is easily applied to and removed from the receptacle and is adjustable to various sizes of receptacles.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a perspective view of my improved strainer holder, the same being shown in operative position on the supply can of a cream separator.

Fig. II is a perspective view of my improved strainer holder.

In the drawing similar reference characters refer to similar parts throughout the several views.

Referring to the drawing, my improved holder comprises a pair of springs 1, these being preferably of zigzaged or sinuous wire. These springs are connected at one end by the coacting adjusting strap members 2 and 3 of flexible steel, the springs being connected to the members 2 and 3 by means of the clips 4.

A clamp 5 is secured to the member 2 and adjustably secured to the member 3 by means of the set screw 6, the member 3 having spaced holes 7 therein. A plurality of loops 8 are provided on the member 2 for holding the end of the member 3 in position.

The coupling straps 9 and 10 are also straps of flexible metal.

The other ends of the springs are connected to the ends of the coupling members by clips 4. The coupling member 10 is provided with an outwardly facing hook 11, while the coupling member 9 has the inwardly facing coacting hook 12. The coupling members have finger pieces 13 for convenience in manipulation.

In use the holder is clamped around the strainer cloth, as shown in Fig. I, the receptacle 15 there shown being the supply can of a centrifugal cream separator. This is shown conventionally.

With the parts thus arranged, the holder may be quickly clamped upon the strainer, effectively holding the same and also quickly releasing it. It may also be conveniently adjusted to different sized receptacles.

Having thus described my invention, what I claim as new and desire to secure by Letters Patent is:

1. In a structure of the class described, the combination of a pair of spring members, a pair of flexible flat adjusting members connecting said spring members at one end thereof, said adjusting members being adjustably connected, and a pair of flexible flat coupling members secured to the other ends of said spring members, said coupling members being provided with coacting hooks and with outwardly projecting finger pieces.

2. A structure of the class described comprising a pair of springs, flexible adjusting members connected to adjacent ends of said springs, the inner ends of said adjusting members being adjustably connected, and flexible coupling members connected to the other ends of said springs provided with coacting hooks.

3. A structure of the class described comprising pairs of flexible strap metal members, one pair of which is adjustably connected and the other of which is detachably connected, and springs connecting the said adjusting and coupling members.

In witness whereof, I have hereunto set my hand.

WILLIAM B. BYAM.